United States Patent
Thompson et al.

(10) Patent No.: US 11,905,223 B2
(45) Date of Patent: Feb. 20, 2024

(54) FERTILIZER COMPOSITIONS HAVING SLOW-RELEASE NITROGEN COMPOUNDS AND METHODS OF FORMING THEREOF

(71) Applicant: OMS INVESTMENTS, INC., Los Angeles, CA (US)

(72) Inventors: Harold E. Thompson, Powell, OH (US); Curtis James MacDonald, Marysville, OH (US); Stephanie Von Ville Velez, Dublin, OH (US); David Patrick Inglish, Delaware, OH (US); Kwame Owusu-Adom, Delaware, OH (US)

(*) Notice: Subject to any disclaimer, the term of this patent is extended or adjusted under 35 U.S.C. 154(b) by 0 days.

(21) Appl. No.: 17/207,538

(22) Filed: Mar. 19, 2021

(65) Prior Publication Data

US 2021/0292252 A1 Sep. 23, 2021

Related U.S. Application Data

(60) Provisional application No. 62/992,271, filed on Mar. 20, 2020.

(51) Int. Cl.
*C05C 9/02* (2006.01)
*C05G 5/12* (2020.01)
*C05G 3/40* (2020.01)

(52) U.S. Cl.
CPC .............. *C05C 9/02* (2013.01); *C05G 3/40* (2020.02); *C05G 5/12* (2020.02)

(58) Field of Classification Search
CPC .... C05C 9/02; C05G 3/40; C05G 5/12; C05G 5/37; Y02P 60/21
See application file for complete search history.

(56) References Cited

U.S. PATENT DOCUMENTS

| | | | | |
|---|---|---|---|---|
| 2,326,265 | A * | 8/1943 | Tawney | C08G 12/12 526/71 |
| 3,697,440 | A * | 10/1972 | Lichtman et al. | B01D 19/0404 516/123 |
| 6,048,378 | A * | 4/2000 | Moore | C05C 9/02 71/64.11 |
| 2005/0003980 | A1* | 1/2005 | Baker | D06L 1/04 510/276 |

(Continued)

FOREIGN PATENT DOCUMENTS

| | | | | |
|---|---|---|---|---|
| CA | 2567262 C | * | 8/2010 | C08F 10/02 |
| GB | 1480787 A | * | 7/1977 | C08G 12/12 |

OTHER PUBLICATIONS

BASF, FoamStar ST 2410, Technical Data Sheet Apr. 2019 (Year: 2019).*

(Continued)

*Primary Examiner* — Jennifer A Smith

(57) ABSTRACT

Methods of forming a fertilizer composition having slow-release nitrogen compounds with a molten process are disclosed. The methods include mixing of a polyethylene wax with urea, formaldehyde, and one or more of an acid catalyst and emulsifier to form a molten methylene urea mixture. The contents of the molten methylene urea mixture react to form slow-release nitrogen compounds. Fertilizer compositions formed of, or including, the slow-release nitrogen compounds are also disclosed.

18 Claims, 8 Drawing Sheets

(56) References Cited

U.S. PATENT DOCUMENTS

| | | | |
|---|---|---|---|
| 2016/0194255 A1* | 7/2016 | Thompson | C05G 3/20 |
| | | | 504/145 |
| 2016/0368832 A1* | 12/2016 | Ringold | C05G 5/30 |
| 2017/0253535 A1* | 9/2017 | Gabrielson | C05G 3/90 |
| 2019/0270064 A1* | 9/2019 | Postma | A01N 25/28 |
| 2019/0276376 A1* | 9/2019 | Schneider | C05D 9/00 |

OTHER PUBLICATIONS

Park et al., Dynamic mechanical analysis of urea-formaldehyde resin adhesives with different formaldehyde to urea molar ratios, J. Appl. Poly. Sci., 108: 2045-2051 (Year: 2007).*

* cited by examiner

FERTILIZER COMPOSITIONS HAVING SLOW-RELEASE NITROGEN COMPOUNDS AND METHODS OF FORMING THEREOF

CROSS-REFERENCE TO RELATED APPLICATIONS

The present application claims the priority benefit of U.S. Provisional Patent App. Ser. No. 62/992,271, titled "FERTILIZER COMPOSITIONS HAVING SLOW-RELEASE NITROGEN COMPOUNDS AND METHODS OF FORMING THEREOF", filed Mar. 20, 2020, which is incorporated by reference herein in its entirety.

TECHNICAL FIELD

The present disclosure relates generally to fertilizer compositions having slow-release nitrogen compounds and methods of making such fertilizer compositions with a molten process.

BACKGROUND

It is desirable for fertilizer compositions to include slow-release nitrogen compounds to provide plants with an extended release of nutrients, minimize leaching of nutrients into the ground, and minimize the number of fertilizer applications required for optimal plant growth. However, conventional production of slow-release nitrogen compounds suffer from a number of undesirable attributes. For example, conventional production of slow-release nitrogen compounds, such as by aqueous processes or by coating processes, can have complicated production processes with multiple time consuming steps, be energy intensive, and form a blend of nitrogen compounds having undesirable ratios of desirable slow-release nitrogen compounds to other nitrogen compounds such as cold-water insoluble nitrogen compounds.

SUMMARY

According to one embodiment, a method of forming a fertilizer composition having slow release nitrogen compounds includes forming a molten mixture of urea, formaldehyde, resin modifier, and one or more of an acid catalyst and an emulsifier and adjusting, as needed, the temperature of the molten mixture to initiate a reaction of the urea and the formaldehyde to form the fertilizer composition.

According to another embodiment, a fertilizer composition includes methylenediurea ("MDU"), dimethylenetriurea ("DMTU"), a resin modifier, and one or more of an acid catalyst and an emulsifier. The resin modifier at least partially occludes the methylenediurea and dimethylenetriurea.

DETAILED DESCRIPTION

Figure 1:
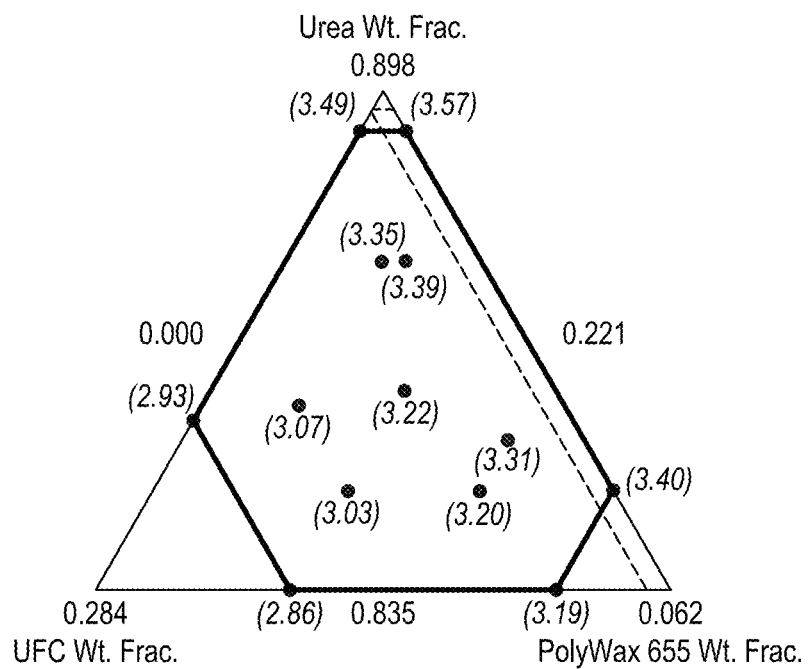
FIG. 1 depicts a contour plot illustrating the ratio of urea to formaldehyde in several example compositions.

The present disclosure generally describes methods of forming fertilizer compositions having slow-release nitrogen compounds using a molten process. As used herein, slow-release nitrogen compounds mean nitrogen compounds which provide a slower and/or longer duration release of nitrogen to plants after the compounds are applied to plants. Generally, fertilizers including slow-release nitrogen compounds can make nitrogen available to plants over a period of weeks to months. The slow-release nitrogen compounds formed from the methods generally described in the present disclosure include desirable short-chain methylene urea products such as methylenediurea ("MDU") and dimethylenetriurea ("DMTU") as well as longer-chain cold-water insoluble nitrogen compounds.

As can be appreciated, slow-release nitrogen compounds such as MDU and DMTU can be formed from chain building of urea and formaldehyde under molten conditions. Under such conditions, urea and formaldehyde can undergo a series of reactions which produce methylene urea products having varying chain lengths. For example, a urea molecule can react with a formaldehyde molecule to produce a monomethylol urea molecule. The monomethylol urea molecule can then react with another urea molecule to form methylenediurea or MDU. As can be appreciated, continued reaction of the urea molecules, formaldehyde molecules, and monomethylol urea molecules can produce methylene urea products having longer chain lengths including dimethylenetriurea, trimethylene tetraurea, etc. These reactions can occur at a reaction temperature of molten urea and molten formaldehyde. According to certain embodiments, the reaction temperature can occur a temperature range of about 100° C. to about 145° C., a temperature range of about 110° C. to about 140° C., a temperature range of about 120° C. to about 135° C., or a temperature of about 129° C. As used herein, a molten state means a partially molten state, a substantially molten state, or an entirely molten state. Temperatures are measured at standard pressure (e.g., at about 1 atm) unless otherwise noted.

As can be appreciated however, methylene urea products having chain lengths longer than MDU and DMTU can be considered to be cold-water insoluble nitrogen compounds because such compounds have limited water solubility when used as a fertilizer. Generally, cold-water insoluble nitrogen compounds are undesirable because such compounds do not readily make nitrogen available to plants and fail to provide a meaningful fertilizing benefit. Conversely, MDU and DMTU are considered desirable because they provide a balanced measure of water solubility and advantageously make nitrogen available to plants over a period of weeks to months.

The methods described herein can form desirable slow-release nitrogen compounds, such as MDU and DMTU, in advantageous ratios with other nitrogen-containing compounds such as cold-water insoluble nitrogen compounds. Generally, the molten process can produce such desirable ratios of slow-release nitrogen compounds through the inclusion of a resin modifier to a molten mixture of urea and formaldehyde. Additionally, it has been found that the use of acid catalysts and defoaming agents can further improve the molten process disclosed herein.

Specifically, it has been discovered that the inclusion of a suitable resin modifier to a molten mixture of urea and formaldehyde can hinder the reactivity of molten urea and formaldehyde to form methylene urea reaction products. Advantageously, the lowered reaction kinetics caused by the resin modifier can favor the formation of desirable short-chain methylene urea reaction products including MDU and DMTU and disfavor the formation of longer chain, cold-water insoluble nitrogen compounds.

For example, the molten process described herein can form a mixture of reaction products having about 30%, or more, of the total nitrogen be at least one of MDU and DMTU in certain embodiments, about 35%, or more, of the total nitrogen be at least one of MDU and DMTU in certain embodiments, about 40%, or more, of the total nitrogen be at least one of MDU and DMTU in certain embodiments, about 45%, or more, of the total nitrogen be at least one of MDU and DMTU in certain embodiments, and about 50%, or more, of the total nitrogen be at least one of MDU and DMTU in certain embodiments. In any such embodiment, about 15% or less of the total nitrogen in the mixture of reaction products can be cold-water insoluble nitrogen. For example, in certain embodiments, about 10%, or less, of the total nitrogen in the mixture of reaction products can be cold-water insoluble nitrogen and, in certain embodiments, about 8%, or less, of the total nitrogen in the mixture of reaction products can be cold-water insoluble nitrogen. In certain embodiments, about 1% to about 15% of the total nitrogen in the mixture of reaction products can be cold-water insoluble nitrogen. As illustration, about 35% of the total nitrogen in a mixture of reaction products can be at least one of MDU or DMTU and about 8%, or less, of the total nitrogen can be cold-water insoluble nitrogen.

Figure 2A:
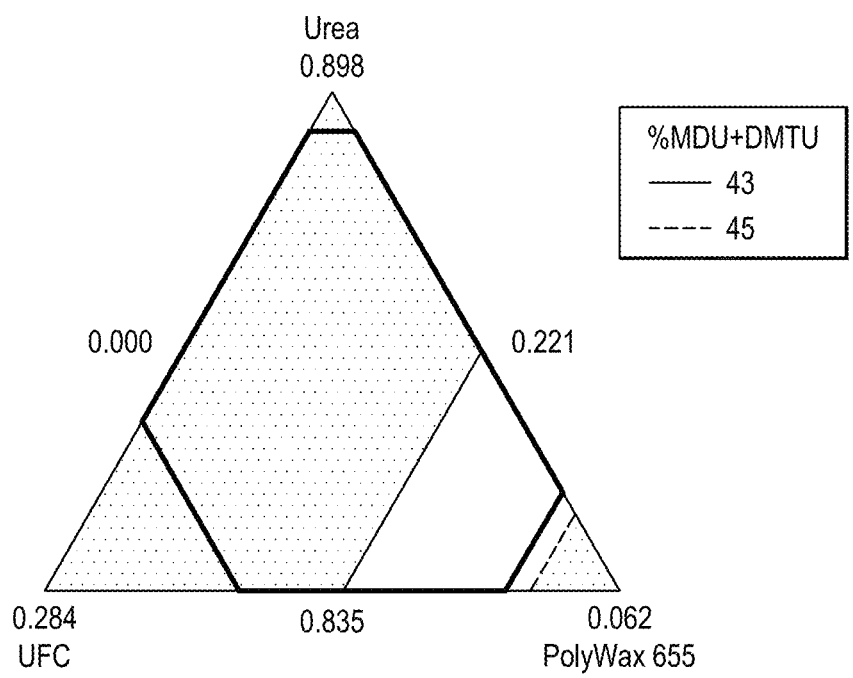
FIG. 2A depicts a contour plot illustrating the quantities of MDU and DMTU formed from the example compositions of FIG. 1.
Figure 2B:
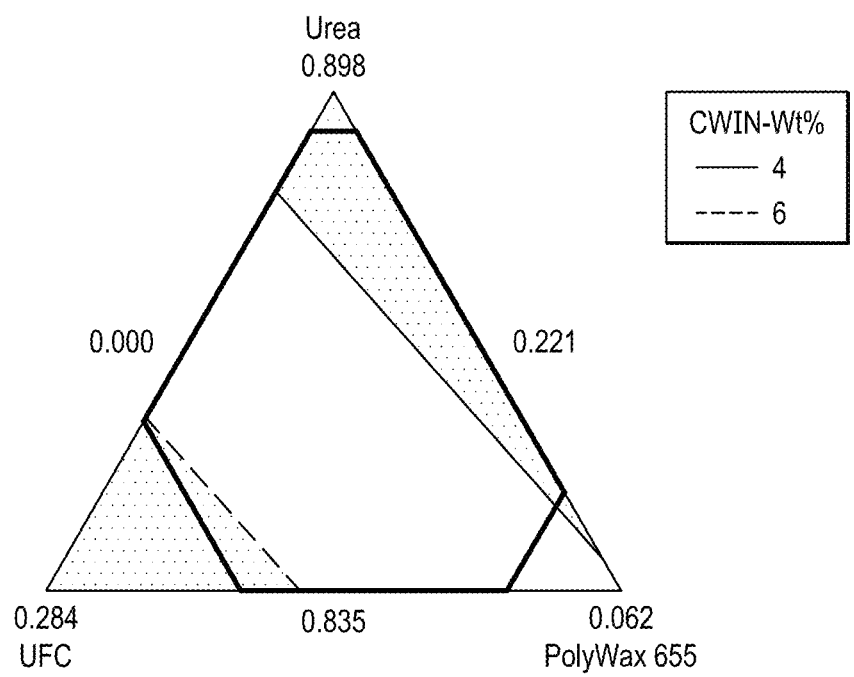
FIG. 2B depicts a contour plot illustrating the quantities of cold-water insoluble nitrogen ("CWIN") formed from the example compositions of FIG. 1.
Figure 3:
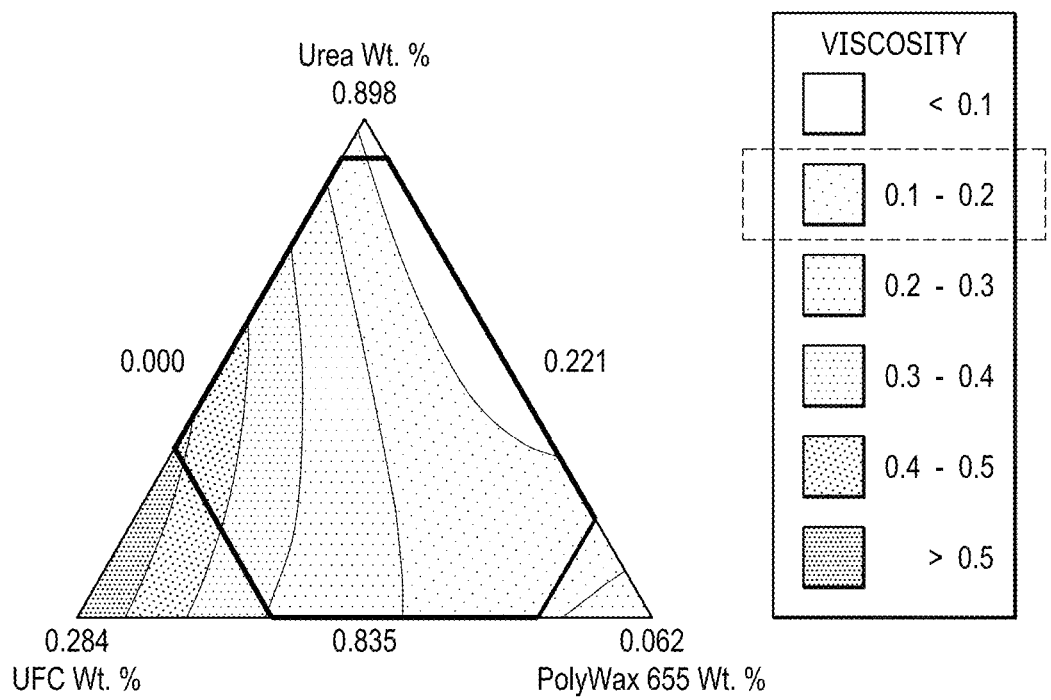
FIG. 3 depicts a contour plot illustrating the viscosity of the examples compositions of FIGS. 1, 2A, and 2B.

Generally, the distribution of reaction products can be influenced through selection of the molar ratio between urea and formaldehyde. For example, increasing the relative amount of urea to a given amount of formaldehyde can decrease the polymer chain length of the methylene urea products. By varying the molar ratio of urea and formaldehyde, specific nitrogen distribution can be obtained. In certain embodiments, suitable ratios of urea to formaldehyde to form desirable slow-release nitrogen compound distributions can include ratios of urea to formaldehyde of about 2.4:1 or greater including, for example, ratios of about 3:1 to about 8:1, and about 3.1:1 to about 3.35:1. As can be appreciated, there is no upper limit on the ratio as a slow-release nitrogen compound distribution can still be formed. In certain embodiments, however, certain ratios of urea to formaldehyde such as ratios of about 3.1:1 to about 3.35:1 can result in slow-release nitrogen compound distributions that are optimal for most plants. FIGS. 1 to 3 additionally show alternative ratios of urea to formaldehyde that can result in suitable slow-release nitrogen compound distributions. As can be appreciated, further alternative ratios may also be suitable by modifying the reaction conditions, reaction time, or the properties of the resin modifier.

As can be appreciated, such ratios can facilitate the formation of fertilizer compositions having desirable distributions of slow-release nitrogen compounds. In certain embodiments, the mixture of reaction products of the molten process described herein can directly be used as a fertilizer composition. Such fertilizer compositions can include desirable quantities of fast-release nitrogen compounds and desirable slow-release nitrogen compounds, such as MDU and DMTU, while including low amounts of cold-water insoluble nitrogen. As can be appreciated, unreacted urea feedstock and formaldehyde can act as a suitable source of fast-release nitrogen compounds in such embodiments.

Conversely, in other embodiments, additional processing and/or additional compounds can be added with the mixture of reaction products formed from the described molten processes to form fertilizers having slow-release nitrogen compounds.

Additional advantageous slow-release nitrogen compounds can be included in a fertilizer composition in certain embodiments. The inclusion of other types of advantageous slow-release nitrogen compounds such as triazones, urea-triazones (such as tetrahydro-s-triazone or 5-methyleneuriedo-2-oxohexahydro-s-triazine), and isobutylidene-diurea ("IBDU") can allow for tailoring of the nitrogen release profile over time. The addition of such compounds can also allow the fertilizer compositions to include any suitable amount of nitrogen. For example, in certain embodiments, the fertilizer composition containing slow-release nitrogen compounds can include from about 1% to about 99%, by weight, nitrogen. In certain embodiments, the fertilizer compositions containing slow-release nitrogen compounds can include from about 20% to about 70%, by weight, nitrogen including, for example, from about 20% to about 50%, by weight, nitrogen. In various embodiments, the amount, by weight, nitrogen in a fertilizer composition containing slow-release nitrogen compounds can be about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 99%.

Additionally, or alternatively, various types of fast-release nitrogen compounds can be added including one or more of additional urea, urea ammonium nitrate ("UAN"), ammonium, and nitrate.

In certain embodiments, the fertilizer compositions can further include one or more non-nitrogen-based components. For example, a fertilizer composition can further include one or more of phosphorus, potassium, calcium, magnesium, manganese, molybdenum, sulfur, and zinc.

The inclusion of a resin modifier in the molten processes described herein can provide further benefits. For example, the continued presence of the resin modifier in the mixture of reaction products can reduce crystallization of the reaction products. Reduced crystallization rates can cause the mixture of reaction products to have desirable rheological properties including reduced viscosity and modulus. As can be appreciated, such rheological properties can provide numerous benefits to fertilizer compositions formed from the mixture of reaction products. For example, the rheological properties can facilitate processing, can improve stability, and can improve sprayability of fertilizers including the mixture of reaction products. Additionally, the improved rheological properties can facilitate granulation of the reaction products.

A mixture of reaction products formed from the molten process described herein and having about 35%, or more, of the total nitrogen be at least one of MDU and DMTU and 8%, or less, of the total nitrogen be cold-water insoluble nitrogen compounds, can have a complex viscosity of about 0.1 Pas to about 0.20 Pas when measured at about 150° C., and a dynamic (absolute) viscosity of about 0.02 Pas to about 0.06 Pas when measured at a temperature of about 150° C. Similarly, such a mixture of reaction products can also have a resin viscous modulus (G") of about 0.5 Pa to about 1.2 Pa when measured at about 150° C.

In certain embodiments, the inclusion of a resin modifier can also influence the rheological phase angle. For example, a mixture of reaction products formed from the molten processes described herein can have a rheological phase angle of about 72 degrees, or greater, and can have a tan delta greater than about 3.0 or about 3.1. Such properties can indicate that the reaction products behave more like a viscous liquid than an elastic solid. As can be appreciated, conventionally produced methylene urea products can have a tan delta of about 2.0 to about 2.2 indicating that such methylene urea products behave more like an elastic solid.

Figure 4:
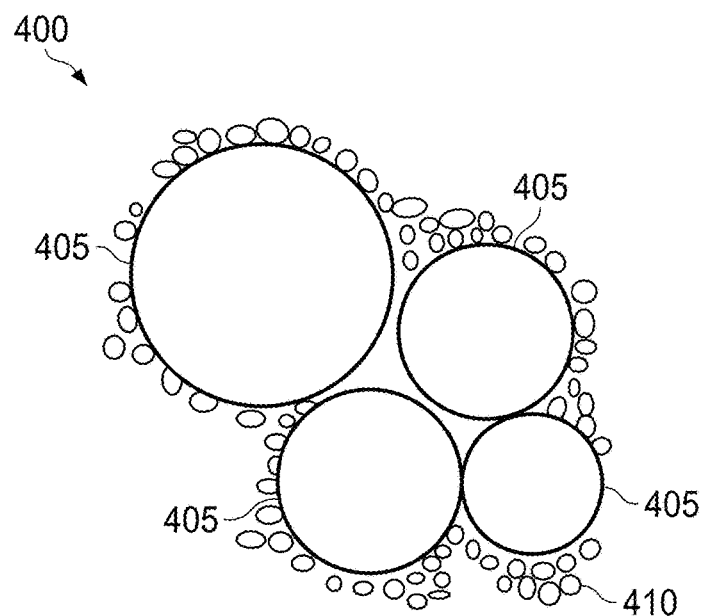
FIG. 4 depicts an illustration of a resin modifier occluding methylene urea resin products.

As can be appreciated, the resin modifier remains in the fertilizer composition after cooling of the molten reaction process. It has been advantageously discovered that the resin modifier can slow the release of nitrogen from the fertilizer compositions by occluding, or partially encapsulating, the methylene urea reaction products, as well as free urea, as illustrated in FIG. 4. Specifically, FIG. 4 depicts a fertilizer composition 400 including methylene urea reaction products 405 and resin modifier 410. The resin modifier 410 occludes, or partially encapsulates, the methylene urea reaction products 405 and can slow the release of nitrogen over time. In certain embodiments, the fertilizer compositions described herein can release nitrogen over about 35 days or greater, over about 60 days or greater, over about 70 days or greater, over about 80 days or greater, over about 90 days or greater, or over about 100 days or greater. Such desirable nitrogen release durations can be accomplished without inclusion of significant quantities of cold-water insoluble nitrogen or separate microencapsulation of the fertilizer compositions.

As can be appreciated, certain benefits imparted by the inclusion of a resin modifier can also be demonstrated by comparing the mixture of reaction products formed by processes including a resin modifier to the reaction products formed by a similar molten process free of any resin modifier.

For example, when producing similar amounts of cold-water insoluble nitrogen, the molten processes described herein can produce greater quantities of MDU and DMTU than a similar process free of a resin modifier. Specifically, in certain embodiments producing identical amounts of cold-water insoluble nitrogen, the molten processes described herein can form a mixture of reaction products having 45% of the total nitrogen be MDU and DMTU while a comparative process free of a resin modifier can form a mixture wherein only 34% of the total nitrogen is MDU and DMTU.

The respective mixtures also exhibit similar trends in rheological properties. For example, the reduced crystallization caused by the resin modifier can allow a mixture of resin products formed with a molten process and a resin modifier and having 45% of the total nitrogen be MDU and DMTU exhibit the same complex viscosity and resin modulus as a mixture, formed without a resin modifier, having 34% of the total nitrogen be MDU and DMTU.

Generally, suitable resin modifiers for the molten processes described herein can include polyethylene waxes which exhibit suitable physical properties in both solid and molten forms. For example, polyethylene waxes having one or more of a number average molecular weight of about 600 to about 1,200, a polydispersity index of about 1.02 to about 1.7, and about 60% to about 96% crystallinity can be suitable because such polyethylene waxes exhibit desirable hardness in solid forms and desirable viscosity ranges while in a molten form. In certain embodiments, suitable resin modifiers can be crystalline polyethylene waxes having a crystallinity of about 60% to about 96% and one or more of a number average molecular weight of about 600 to about 1,200 and a polydispersity index of about 1.02 to about 1.7. Polyethylene waxes having molecular weight distributions and polydispersity indexes outside of such ranges can be, for example, too soft in a solid form and too viscous in the molten state. Selection of the polyethylene wax can also influence the yield and conversion rates of the molten reactions described herein.

As used herein, the polydispersity index is used to indicate the relative width, or range, of molecular weight distributions of a polymer or blend of polymers according to Formula I:

$$\text{Polydispersity index} = \frac{M_W}{M_n}$$

wherein $M_w$ is the weight average molecular weight and $M_n$ is the number average molecular weight. As can be appreciated, these values can be obtained using any known technique such as, for example, size exclusion chromatography. Materials having a greater polydispersity index can be composed of many different chain lengths. A monodisperse polymer, where all the chain lengths are equal would have a polydispersity index of 1.0.

As used herein, the degree of crystallinity is used to refer to the percentage of a polymer in the crystalline form. The degree of crystallinity can be measured by various techniques including x-ray diffraction, differential scanning calorimetry ("DSC"), and nuclear magnetic resonance ("NMR") among other techniques. In certain embodiments, suitable crystalline polyethylene waxes can have a degree of crystallinity, determined via DSC, of about 60% to about 96%. As can be appreciated, the degree of crystallinity can be determined by DSC using the equation: % Crystallinity= $[\Delta Hm-\Delta Hc]/\Delta Hm°*100\%$, where $\Delta Hm$ is the heat of melting, $\Delta Hc$ is the heat of cold crystallization, and $\Delta Hm°$ is the heat of melting of a 100% crystalline sample (e.g., 293.6 J/g for polyethylene). In certain embodiments, the crystalline polyethylene wax can have a degree of crystallinity of about 65% to about 96%, in certain embodiments, about 65% to about 80%, in certain embodiments, about 70% to about 80%, and in certain embodiments, about 76%.

In certain embodiments, suitable polyethylene waxes can have a number average molecular weight average of about 600 to about 1,000 and a polydispersity index of about 1.08 to about 1.09. As can be appreciated, more than one polyethylene wax can also, or alternatively, be used to reach the desired properties. For example, a first crystalline polyethylene wax having a molecular weight of about 600 and a second crystalline polyethylene wax having a molecular weight of about 1,000 can be used in certain embodiments.

Such polyethylene waxes can be suitable to both reduce the molten reaction kinetics of urea and formaldehyde and to reduce crystallization rates of the methylene urea reaction products. In certain embodiments, suitable polyethylene waxes can also exhibit a needle penetration hardness of about 1 mm to about 3 mm when measured at 25° C. The dynamic viscosity of a suitable polyethylene wax can be about 7 cps to about 15 cps when measured at a temperature of 150° C.

Generally, the polyethylene wax can be melted and combined in solution with the molten urea and formaldehyde to form an emulsion of two immiscible fluids which require agitation for uniformity. The emulsion hinders reactivity and can prevent excess methylene urea chain building. In certain embodiments, the polyethylene wax can be melted before addition to the molten urea and formaldehyde. In alternative embodiments, the polyethylene wax can be melted simultaneously with either of, or both of, urea and formaldehyde.

Generally, a resin modifier can be included at about 2% to about 20%, by weight, of the molten mixture. For example, in certain embodiments, about 2% to about 10%, by weight, or about 2.5% to about 7.5%, by weight of the molten mixture can be the resin modifier. In certain embodiments, about 5%, by weight of the molten mixture can be the resin modifier.

It has been further discovered that the formation of methylene urea reaction products using a molten process as described herein can be further enhanced through use of an acid catalyst. As will be appreciated, an acid catalyst can influence the reaction kinetics as well as the reaction products of the molten process. For example, weak acid catalysts can moderately influence the reaction kinetics and can facilitate the formation of MDU and DMTU at lower temperatures without increasing the amount of cold water insoluble nitrogen products formed in the reaction. It is believed that a weak acid catalyst can favor the formation of MDU and DMTU and decrease side products formed from unstable side reaction (such as those forming cyclic products). Suitable weak acids to act as an acid catalyst can include acids having a $pK_a$ of about 0.50 to about 5.0, a $pK_a$ of about 0.75 to about 4.0, or a $pK_a$ of about 0.80 to about 3.86.

In certain embodiments, specific examples of suitable weak acids to act as an acid catalyst can include iodic acid, oxalic acid, chlorous acid, phosphoric acid, arsenic acid, chloroacetic acid, citric acid, hydrofluoric acid, nitrous acid, formic acid, and lactic acid. In certain embodiments, a suitable weak acid for the acid catalyst can be phosphoric acid.

In certain embodiments, dilute concentrations of a stronger acid can alternatively be used as the acid catalyst. For example, one or more of hydrochloric acid, sulfuric acid, or nitric acid can be used as an acid catalyst in the molar ratio of acid to formaldehyde is sufficiently low.

Generally, the amount of acid catalyst included in a molten process can be proportionate to the amount of formaldehyde included in the molten process. For example, when the acid catalyst is phosphoric acid, about $4.5*10^{-5}$ moles to about $4.0*10^{-3}$ moles of phosphoric acid can be included for every mole of formaldehyde such as about $1.35*10^{-3}$ moles of phosphoric acid per mole of formaldehyde.

In addition to lowering the temperature requirements, it has been unexpectedly found that use of an acid catalyst can also decrease the dynamic viscosity of the reaction products formed in the molten process. In known molten urea formaldehyde reactions, the use of an acid to catalyze the urea formaldehyde reactions has resulted in reaction products having longer polymer chain lengths as demonstrated by an increase to the resin viscosity. In contrast, in the present disclosure, the use of a acid catalyst has been found to synergistically work with the resin modifier (e.g., a polyethylene wax) to produce short chain (e.g., MDU and DMTU) reaction products having a lower resin viscosity.

It is further believed that use of a acid catalyst can lead to the formation of resins having greater stability than comparative resins formed without an acid. For example, the use of an acid catalyst can decrease the amount of ammonia emitted during a molten process described herein. Ammonia emission at reaction temperatures is associated with instability of a resin.

Figure 5:
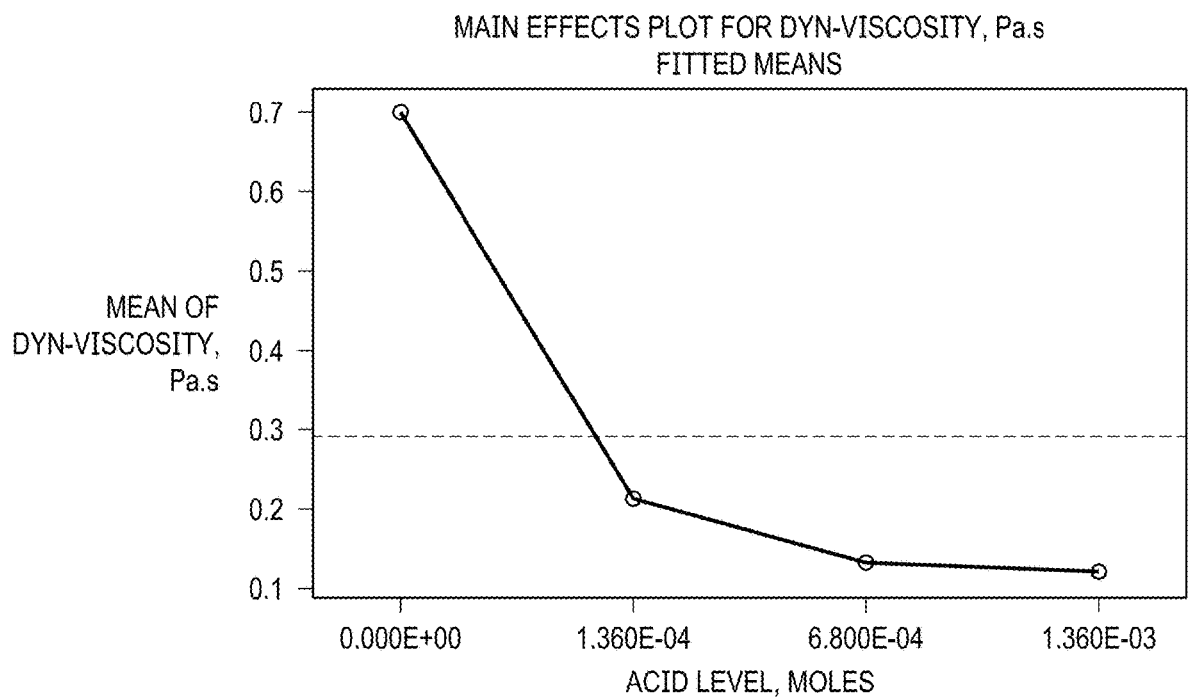
FIG. 5 depicts a graph illustrating the dynamic viscosity of methylene urea resin products as a function of acid catalyst concentration.

The dynamic viscosity of a resin produced from a molten process, as a function of weak acid catalyst concentration, is depicted in FIG. 5. All testing data was measured at a temperature of 129.5° C. As depicted by FIG. 5, increasing the concentration of the acid catalyst unexpectedly decreased the dynamic viscosity of the reaction products. In certain embodiments, the dynamic viscosity can be about 0.4 Pa·s or less, about 0.3 Pa·s or less, about 0.2 Pa·s or less, or about 0.1 Pa·s.

In addition to the use of an acid catalyst, the use of emulsifiers in the molten reaction processes described herein has also been found to decrease the dynamic viscosity of the reaction products. It is believed that the decreased dynamic viscosity is due to improved emulsification which increases the contact area of the resin modifier to the urea and formaldehyde reactants. In certain embodiments, it has been found useful to use more than one emulsifier.

For example, in certain embodiments, multiple emulsifiers can be used to control foaming at the different temperature levels found in the molten processes described herein. For example, a first emulsifier can be included to decrease the quantity of foam formed during the relatively lower temperature portions of a molten process and a second emulsifier can be included to decrease the quantity of foam formed during the higher reaction temperatures during the later portions of the molten process described herein.

Examples of suitable emulsifiers for the lower temperature portions of the molten processes described herein can include certain defoaming agents such as star macromolecule defoamers. As can be appreciated, such defoaming agents are a type of specialized polymer having a 3-D star shaped structure and including a core and a large number of arms distributed radially away from the core. The arms have hydrophobic and hydrophilic portions which can act to minimize foam. Suitable star macromolecule defoamers can be commercially obtained in certain embodiments. For example, FoamStar® ST2400 marketed by the BASF Corporation (Ludwigshafen, Germany) can be a suitable defoaming agent. Generally, such defoaming agents can be included at known concentrations. For example, star-polymer defoaming agents can be included at concentrations of about 500 ppm to about 2,000 ppm.

To control foaming during the higher temperature portions of the molten processes described herein, it can be useful to include an emulsifier that is effective against heat created foam. Examples of such emulsifiers include certain defoaming agents such as those derived from fatty acids such as polypropylene glycol esters and monoglycerides. In certain embodiments, a combination of polypropylene glycol ester and monoglyceride can be used as a defoamer such as an about 85%, by weight, polypropylene glycol ester to about 15%, by weight, monoglyceride blend.

When high temperature emulsifiers are included, such emulsifiers can be added based on the moisture concentration in the molten reactor. As can be appreciated, typical moisture levels in the molten process described herein are about 10% or less in certain embodiments and about 8% or less in certain embodiments. In certain embodiments, the high temperature emulsifiers can be included at concentrations of about 500 ppm to about 5,000 ppm, at about 600 ppm to about 4,000 ppm, or at about 2,550 ppm. As can be appreciated, high temperature emulsifiers can be commercially obtained in certain embodiments. For example, a suitable polypropylene glycol ester can be Hallstar® PGMS Pure available from the Hallstar Co. (Chicago, IL) and suitable monoglycerides can include Dimodan® P-T K-A MB available from DuPont de Nemours, Inc. (Midland, MI).

Figure 6A:
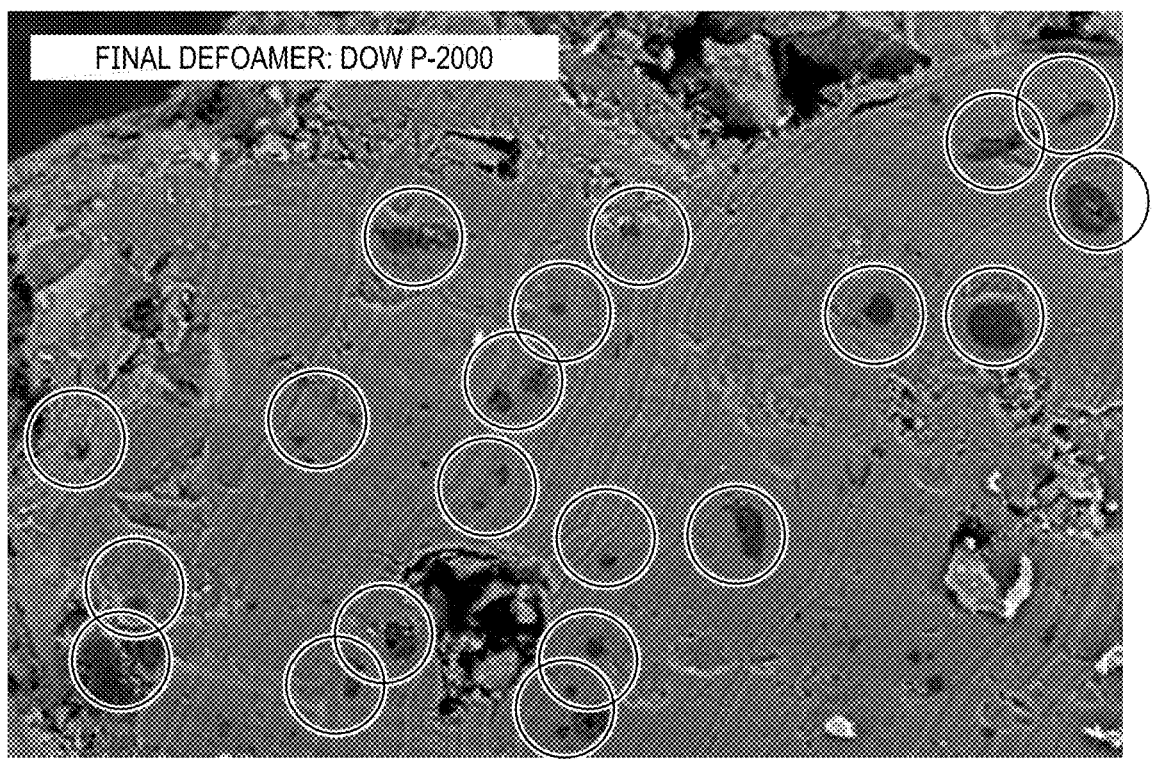
FIGS. 6A and 6B depict scanning electron microscopy images showing the effect of a high temperature defoaming agent on methylene urea resin products.
Figure 6B:
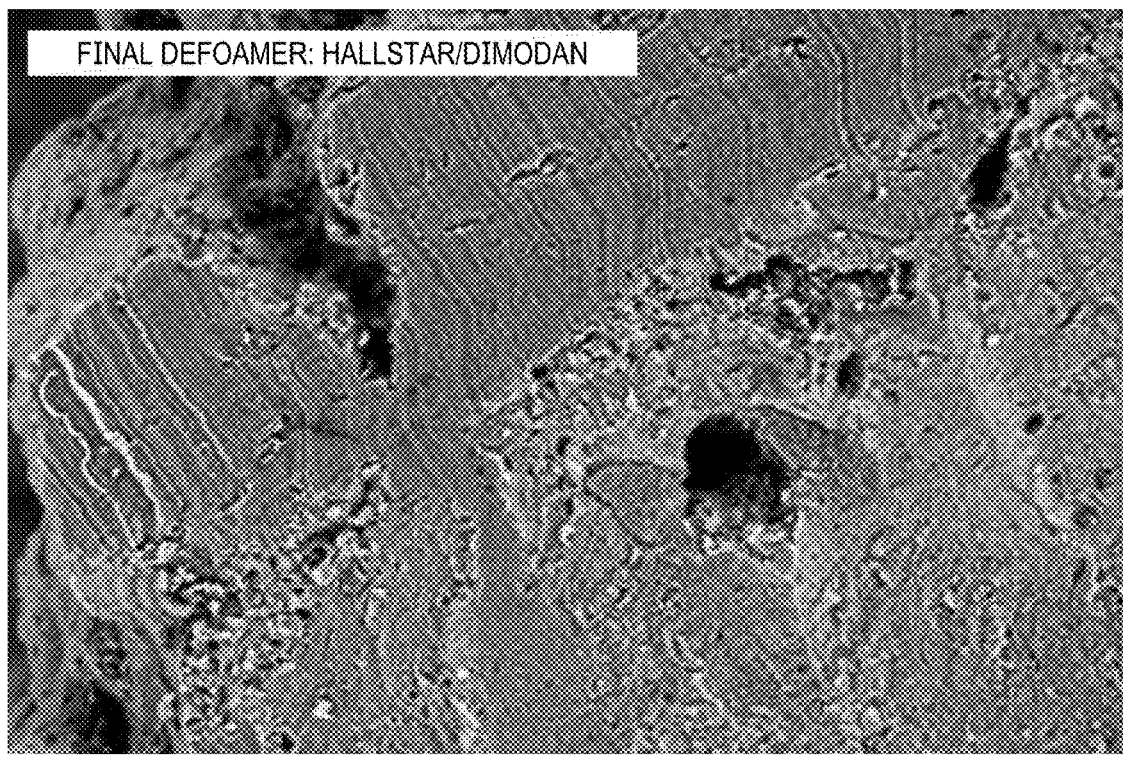
Figure 7:
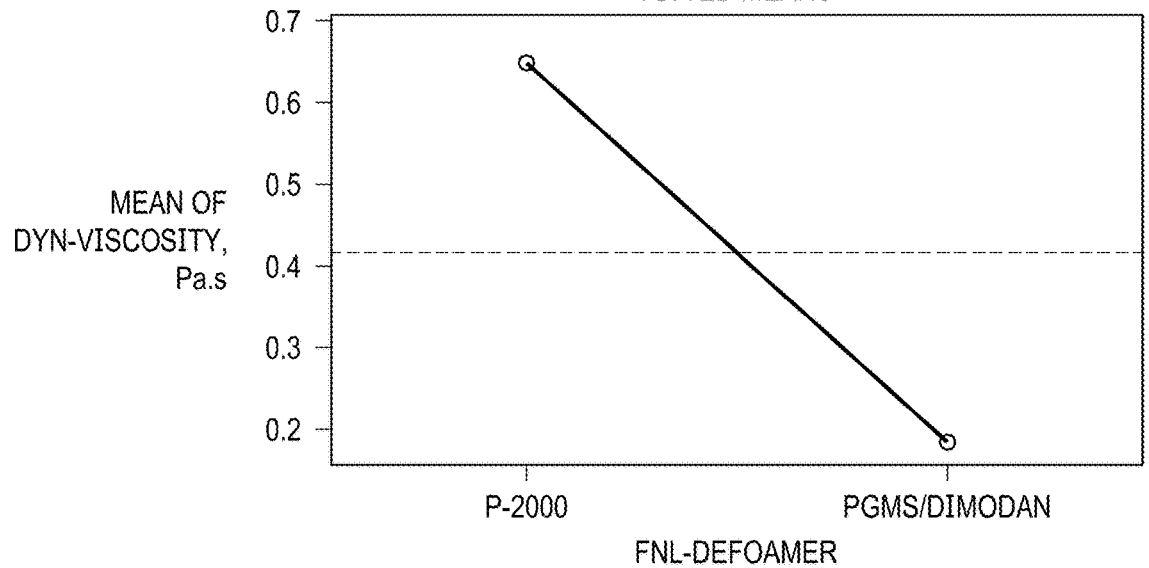
FIG. 7 depicts a graph illustrating the dynamic viscosity of methylene urea resin products with different defoaming agents.
Figure 8:
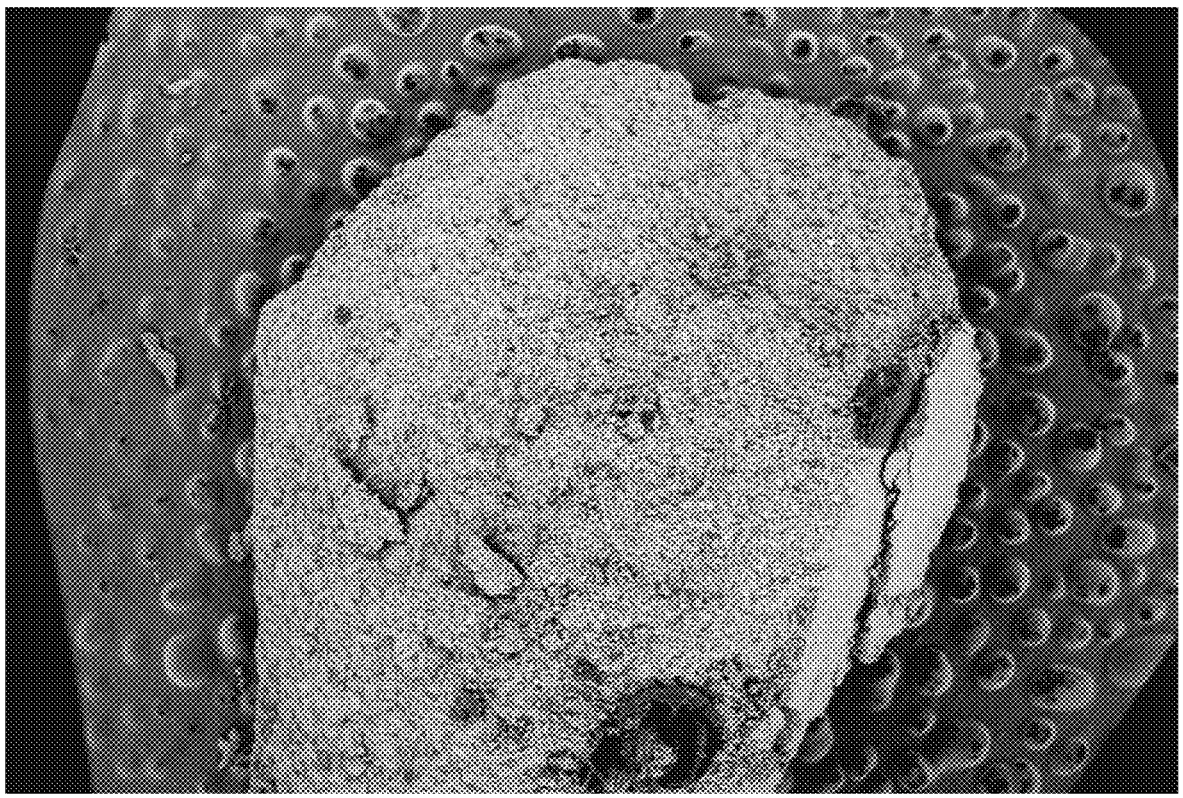
FIG. 8 is a scanning electron microscopy image of an example composition.

In embodiments including emulsifiers, particularly the high temperature emulsifiers, improvements to emulsification and resin viscosity were observed. In particular, scanning electron microscopy images, as depicted in FIGS. 6A and 6B, illustrate that use of the blend of polypropylene glycol ester and monoglycerides (FIG. 6B) resulted in reaction products with significantly smaller agglomerates of polyethylene wax (resin modifier) than a reaction product formed using a comparative polypropylene glycol defoamer (FIG. 6A). This improved emulsification also lowered the dynamic viscosity of the urea formaldehyde reaction products as depicted in FIG. 7. In certain embodiments, the dynamic viscosity of reaction products formed using high temperature defoaming agents can be about 0.4 Pa·s or less, about 0.3 Pa·s or less, about 0.2 Pa·s or less, or about 0.1 Pa·s.

As can be appreciated, urea and formaldehyde for the molten process can be provided in any suitable manner. For example, it can be useful in certain embodiments to provide formaldehyde in the form of a urea-formaldehyde concentrate. The use of a urea-formaldehyde concentrate can simplify processing and is widely available.

In certain embodiments, a heat treatment step can be performed after formation of the reaction products to reduce crystallization of the mixture. In such embodiments, the molten mixture of reaction products can be heated to a higher temperature before being allowed to cool. As can be appreciated, once the reaction products form a solution, it can be more difficult for the reaction products to subsequently crystallize and fall out of solution even when cooled. Additionally, during a heat treatment step, the resin modifier can also block nucleation sites which seed crystallization of the reaction products. In certain embodiments, a heat treatment step can occur at a temperature ranging from about 135° C. to about 160° C. and can have a duration of about 10 minutes. In certain embodiments, the heat treatment step can occur at a temperature ranging from about 135° C. to about 150° C. for a duration of about 10 minutes. In certain embodiments, the heat treatment step can occur at a temperature of about 138° C.

The fertilizer compositions described herein can be applied to a seed, seedling, plant, or lawn. In certain embodiments, the fertilizer compositions can be sprayed onto a soil, seed, seedling, plant, or lawn using sprayers known to one of ordinary skill in the art, such as trigger sprayers (e.g., hand-held trigger sprayers), wand sprayers, bottle sprayers, compression sprayers, tank sprayers, pump sprayers, hose-end sprayers, and backpack sprayers. The fertilizer compositions described herein can also be granulated into a solid fertilizer and applied to soil using a rotary spreader.

Alternatively, the slow-release nitrogen compounds formed by the molten process described herein can be granulated by application to an inert carrier as known in the art. For example, the slow-release nitrogen compounds can be sprayed (in molten form) onto inert carriers such as rice hulls to form granules. Such granules can be further granulated by dry milling, parboiling, or comminution in one or more of a rotating drum fluidized bed, pan, pellet mill, or the like. In certain such embodiments, the inert carriers, such as rice hulls, can have a size guide number ("SGN") of between about 20 to about 70. The inert carriers can be about 1% to about 50%, by weight, of the granule and the slow-release nitrogen compounds can be about 40% to about 60%, by weight, of the granule in various embodiments. The granules can be about 0.5 mm to about 5 mm in size.

In certain embodiments, additional components can be granulated into such granules. For example, additional fertilizers and pesticidal agents can be granulated into the granules In certain embodiments, one or more of potassium sulfate, ammonium sulfate, 3,6-Dichloro-2-methoxybenzoic acid (dicamba), 2,4-dichlorophenoxy acetic acid (2,4-D), methyl chlorophenoxy propionic acid (MCPP-P) calcium nitrate, ammonium sulfate, sulfur-coated urea, isobutylidene diurea, ammonium nitrate, ureaform, urea formaldehyde reaction product, urea, anhydrous ammonia, ammonium polyphosphate, monoammonium phosphate, diammonium phosphate, potassium nitrate, potassium sulfate, polymer coated urea, micro elements, mono-ammonium phosphate, potassium chloride, and mixtures thereof, pesticides, micronutrients, biostimulants, macronutrients, and inert solid carriers can be granulated by mixing with the slow-release nitrogen compounds and inert carrier.

In certain embodiments, a fertilizer composition described herein can be applied in amounts of from about 0.1 lb. of nitrogen per 1000 ft$^2$ to about 6 lbs. of nitrogen per 1000 ft$^2$. In certain embodiments, the fertilizer compositions can be formulated as a ready-to-use or ready-to-spray formulation.

In embodiments in which the fertilizer composition is granular, the granular compositions can be applied to a soil, seed, seedling, plant or lawn by sprinkling, or spreading, the composition onto the soil, seed, seedling, plant or lawn.

As can be appreciated, the slow-release nitrogen compounds described herein can be produced by any process that includes the addition of a resin modifier to a molten mixture of urea and formaldehyde.

In certain embodiments, the process used to form the slow-release nitrogen compounds can include the step of weighing the urea and formaldehyde, or urea-formaldehyde concentrate and melting the resin modifier. In embodiments wherein the resin modifier is a crystalline polyethylene wax, the resin modifier can be melted at a temperature of about 120° C. to about 130° C. Next, the urea and urea-formaldehyde concentrate can be melted at, for example, a temperature of 104° C. In certain embodiments, it can be useful to agitate the molten mixture. In certain embodiments, the crystalline polyethylene wax can added to the urea and urea-formaldehyde concentrate as soon as the mixture melts. In such embodiments, the mixture can be held at a temperature of 119.7° C., with agitation, for about 10 to 45 minutes or about 15- to 30 minutes in various embodiments. In certain embodiments, the molten mixture of urea, urea-formaldehyde concentrate, and the resin modifier can be held at a temperature of 129° C. for 15 minutes. During the 15 minute duration, the urea and formaldehyde in the molten mixture can form methylene urea products including MDU and DMTU. In certain embodiments, substantially all of the slow-release nitrogen compounds formed are MDU and DMTU.

As an alternative to embodiments which melt each of the components at a first temperature below the reaction temperature, each of the components (e.g., the urea, formaldehyde and resin modifier) can alternatively be melted, and mixed, at the reaction temperature and then maintained at the reaction temperature until methylene urea products are formed. Remaining steps, such as a heat treatment step, can be performed substantially unmodified.

After the reaction process is completed, a heat treatment step can be performed. In certain embodiments, a heat treatment step can include heating of the molten mixture to a temperature of 138° C. for a duration of time such as a period of about 10 minutes. The heat treatment step can reduce crystallization of the reaction products and can improve the rheological properties of the mixture. In embodiments scaling the reaction process to larger batches or which use continuous production, the heat treatment step may not be necessary as the minimization of heat losses at such larger scales can negate the need for a heat treatment step.

In certain embodiments, the production of the fertilizer composition described herein can be performed in a batch process, a continuous process, or a combination of both batch and continuous processes.

EXAMPLES

The following examples are included to illustrate certain aspects and embodiments of the present disclosure, and are not intended to limit the disclosure to the disclosed embodiments.

Fertilizer Compositions

Several example fertilizer compositions having slow-release nitrogen fertilizer compounds were formed. In each example, a molten mixture with a total weight of 500 grams was melted at 130° C. Each molten mixture included 5%, by weight, of a crystalline polyethylene wax having a molecular weight between 600 and 1,000, a polydispersity between 1.08 and 1.09, and 76% crystallinity. The molten mixture for each example further included varying quantities of urea and urea formaldehyde concentrate.

FIGS. 1 to 3 depict contour plots illustrating, respectively, the ratios of urea to formaldehyde in various examples, a contour plot indicating the amount of MDU and DMTU formed as a percent of the total nitrogen, a contour plot indicating the amount of cold-water insoluble nitrogen ("CWIN") formed, and a mixture contour plot indicating the rheological properties of the previous two graphs. In FIG. 1, the italicized numbers indicate molar ratios of urea to formaldehyde. In FIG. 3, the viscosity units are Pa·S.

As indicated by the graphs, molten mixtures including a ratio of urea to formaldehyde in a ratio of about 3.1:1 to about 3.35:1 formed desirable quantities of MDU and DMTU while also demonstrating low viscosity.

Greenhouse Trial

The fertilizing effect of Example 4 (a fertilizer composition prepared according to the present disclosure) was compared to Example 5 (Nutralene® 40-0-0 manufactured by the Koch Agronomic Services, LLC (Wichita, KS)). Nutralene® 40-0-0 is a commercial fertilizer including 40% total nitrogen (4% urea, 17% water soluble nitrogen, and 19% water insoluble nitrogen). The nitrogen distributions of Examples 4 and 5 are depicted in Table 1.

TABLE 1

| | Soluble Urea (%) | MDU and DMTU (%) | Cold Water Insoluble Nitrogen (%) | Slow Release Nitrogen (%) |
|---|---|---|---|---|
| Example 4 | 41 | 55 | 4 | 59 |
| Example 5 | 10 | 42.5 | 47.5 | 90 |

Examples 4 and 5 were evaluated using a greenhouse trial. In the greenhouse trial, Examples 4 and 5 were dried and milled to 20 microns and applied to 'Celebration' bermudagrass at a rate of 1.0 lbs/1000 ft². The greenhouse was set to an 85° F./70° F. day/night temperature cycle and held at 50% humidity. 1" of irrigation was delivered per week. The fertilizer response of Examples 4 and 5 was measured by determining clipping chlorophyll mass in accordance to the methods described in Baldwin, C. M., H. Liu, L. B. McCarty, H. Luo, C. Wells, and J. E. Toler, *Impact of Altered Light Spectral Quality on Warm-Season Turfgrass Growth under Greenhouse Conditions*, Crop Science Vol. 49 July-August 2009. The relative chlorophyll percentage of Examples 4 and 5 was then determined from their respective clipping chlorophyll masses and is depicted in Table 2.

TABLE 2

| | Relative Chlorophyll Percentage-Day 42 | Relative Chlorophyll Percentage-Day 84 |
|---|---|---|
| Example 4 | 73.2% | 59.4% |
| Example 5 | 81.2% | 45.2% |

As illustrated by Table 2, Example 4 maintains a relative chlorophyll percentage of greater than 50% 84 days after application to 'Celebration' bermudagrass despite having only small amounts of cold water insoluble nitrogen. As such, Example 4 exhibits a meaningful greening effect. Prior to the present disclosure, it was believed that significant quantities of cold water insoluble nitrogen, or alternative methods to slow nitrogen release such as microencapsulation, were required for a fertilizer to exhibit continued greening over such an extended duration of time (i.e., 84 days). For example, traditional fertilizers including only 4% cold water insoluble nitrogen, as present in Example 4, would be expected to exhibit substantially no greening effect at 84 days.

Scanning Electron Microscopy

FIG. 5 depicts a scanning electron microscopy image of a shaved cross section of an example composition at 60 times magnification. As depicted in FIG. 5, the methylene urea reaction products are partially occluded by the polyethylene wax with dark areas showing areas of concentrated polyethylene wax, lighter areas with relatively little polyethylene wax, and mid-toned areas showing a mix of both polyethylene wax and methylene urea reaction products.

Large Batch Example—Example 6

An additional fertilizer composition, Example 6, was formed to evaluate scaling of the technology to larger batches. Example 6 also evaluated the use of acid catalysts and defoaming agents.

Example 6 was formed by adding 10.78 kg of formaldehyde concentrate (60% formaldehyde, 25% urea, and 15% water, by weight) into a 15 gallon stainless steel reactor. As initial heat was applied, 38.73 kg of urea was added with constant agitation and then the reaction mixture was allowed to reach 104° C. Once the reaction mixture reached 104° C., defoaming agents and 1.61 kg of molten (125° C. to 130° C.) crystalline polyethylene wax were added. The defoaming agents were Foamstar® ST2400 (final concentration of 1,000 ppm) and an 85%, by weight, Hallstar PGMS Pure and 15%, by weight, Dimodan® P-T K-A MB blend (final concentration of 2,550 ppm for the blend). The crystalline polyethylene wax was Acculin® 622 marketed by the International Group, Inc. (Toronto, Canada). Following addition of the defoaming agents and crystalline polyethylene wax, an acid catalyst (0.1 M phosphoric acid ($H_3PO_4$)) was added (final concentration of $1.36*10^{-3}$ moles of $H_3PO_4$ per mole of formaldehyde). Following addition of the acid catalyst, the temperature was increased to 119.5° C. for 30 minutes at constant agitation, then increased to 129.5° C. for 15 minutes. The molten resin was then spray dried using a spray manifold maintained at 129.5° C. to form granules. Solidification of the molten resin into granules occurred within a few seconds.

Rheological Properties

Figure 9:
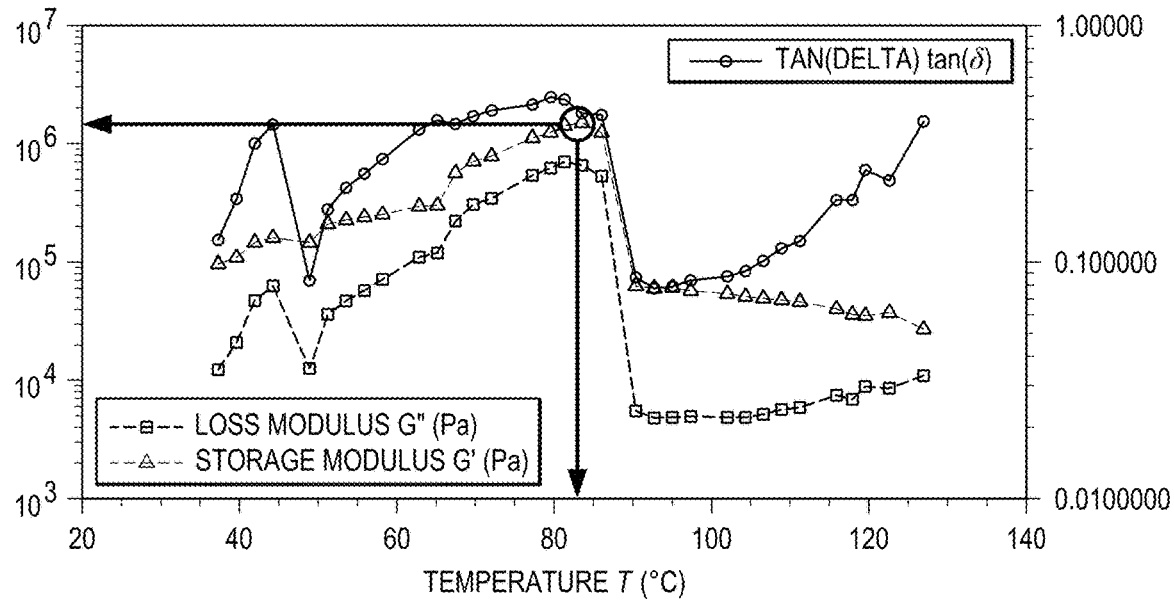
FIG. 9 depicts a graph showing the solidification curve of Example 6.

The storage modulus of Example 6 was determined by using a TA Instruments HR-2 Discovery Hybrid Rheometer with an Environmental Test Chamber (available from TA Instruments; Wood Dale, IL) using liquid nitrogen cooling to control temperature loss rate. The Rheometer extended the solidification time from a few seconds to 15 minutes at a constant cooling rate of 6° C. per minute. During cooling, samples of the reaction products from Example 6 were subjected to a constant level of oscillation strain. The solidification curve is depicted in FIG. 9.

Table 3 depicts the results of the rheological testing of Example 6. Table 3 additionally depicts the rheological testing results of a comparative methylene urea fertilizer granule produced through a traditional molten process. The comparative methylene urea fertilizer granule was formulated with a 4.0:1 urea to formaldehyde mole ratio, without a weak acid or wax catalyst, at conventional temperatures. The peak storage modulus indicates the point at which initial solidification occurs. The Tan(delta) indicates the material's degree of elastic or solid like behavior with a Tan(delta) number nearer to zero indicating a more elastic solid.

TABLE 3

| Example | Peak Storage Modulus (Pa) | Tan(Delta) Mean | Temperature at Peak Storage Modulus (° C) |
|---|---|---|---|
| Inv. Example 6 | 1,548,400 | 0.325 | 83.6 |
| Comp. Example 7 | 3,211,960 | 0.247 | 84.0 |

As depicted by Table 3, inventive Example 6 exhibited a significantly decreased peak storage modulus and a lower Tan(delta). These results indicate that inventive Example 6 has a lower resin bonding strength reducing the chances for formation of oversized granules during cooling and agglomeration. As can be appreciated, the production of oversized, or agglomerated, granules can require additional processing leading to lower overall production and increased costs.

Table 4 depicts the granulation "first pass" rate for Examples 6 and 7. The first pass rate indicates the percentage of granules or particles exiting the granulating which do not require additional milling or screening.

TABLE 4

| Example | On-Size (%) | Fine (%) | Oversize (%) |
|---|---|---|---|
| Inv. Example 6 | 85 | 10 | 5 |
| Comp. Example 7 | 60 | 25 | 15 |

As depicted in Table 4, the lower peak storage modulus of inventive Example 6 produced granules of the desired size at a much greater percentage than comparative Example 7.

Figure 10:
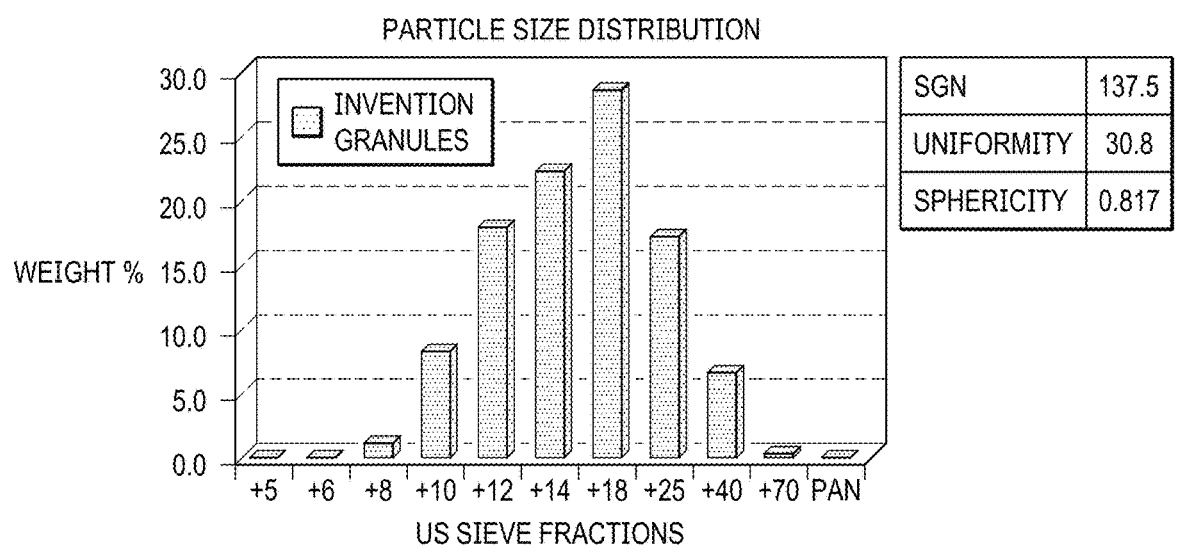
FIG. 10 depicts a graph showing the particle size distribution of example 6.

Inventive Example 6 was also evaluated using a CamSizer image based particle size/shape analysis instrument (available from Retsch Technology (Haan, Germany)) to determine a particle size distribution, shape information, and uniformity data. Inventive Example 6 had an N-P-K ratio of 41-0-0, a Size Guide Number ("SGN") of 137, a uniformity index of 30.8, and a sphericity value of 0.817. As can be appreciated, these results indicate that inventive Example 6 produces granules in a tighter distribution curve than traditional methylene urea formaldehyde granules and with more spherical granules. The particle size distribution is depicted in FIG. 10.

Examples 8 to 15

Additional "large batch" examples were formed to investigate the effect of a weak acid on reaction temperature and dynamic viscosity. In each of Examples 8 to 15, 38.32 Kg urea, 11.44 Kg urea formaldehyde concentrate, 1.604 kg crystalline polyethylene wax (Acculin® 622), 45.36 g defoaming agent (FoamStar® ST2400), 117.93 g of an 85%, by weight, Hallstar PGMS Pure and 15%, by weight, Dimodan® P-T K-A MB blend, and a varying amount of 1M phosphoric acid ($H_3PO_4$) were prepared using a process similar to that described for Example 6. The amount of phosphoric acid in each of Examples 8 to 15 varied from 0.00136 mol to 0.0022 mol.

The overall reaction rate and conversion percentage was determined for each of Examples 8 to 15 by sampling 4 to 6 times during the molten reaction process and analytically determining the concentration of MDU. The results of examples 8 to 15 are depicted in Table 5 and FIG. 11. The pooled standard deviation was used to calculate confidence intervals (95%).

TABLE 5

| Example | Amount of Acid (mols) | Conversion (%) |
|---|---|---|
| Ex. 8 | 0.00136 | 74.28 |
| Ex. 9 | 0.00136 | 71.33 |
| Ex. 10 | 0.00136 | 71.99 |
| Ex. 11 | 0.00136 | 76.49 |
| Ex. 12 | 0.00163 | 73.88 |
| Ex. 13 | 0.0019 | 71.9 |
| Ex. 14 | 0.0022 | 72.66 |
| Ex. 15 | 0.00204 | 70.66 |

Figure 11:
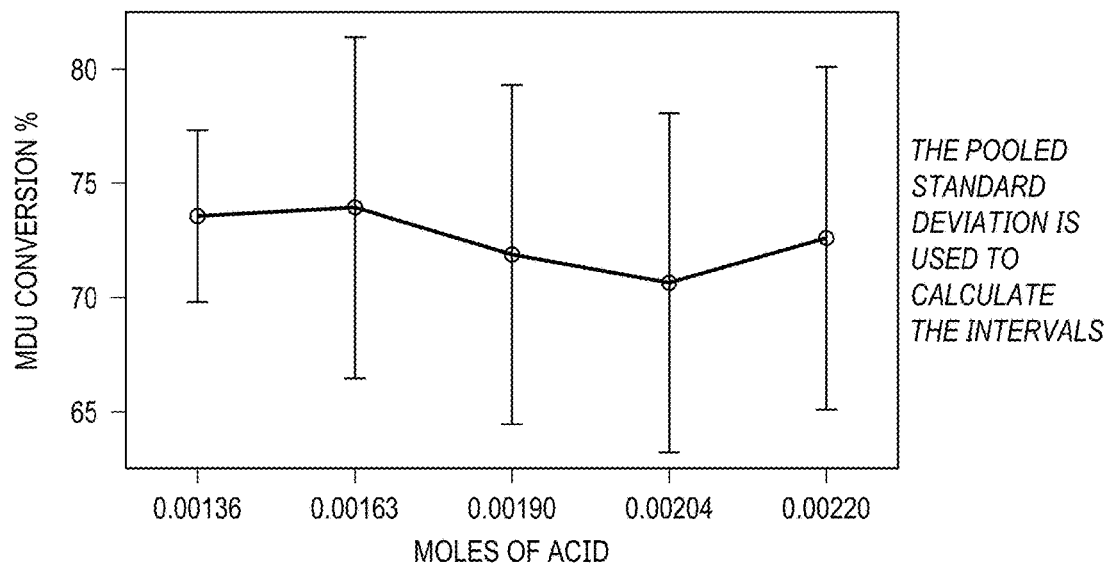

As depicted in Table 5 and FIG. 11, varying the amount of the weak acid was found to have a significant impact on the conversion with Examples 8 and 11 performing better than the remaining examples.

Figure 12:
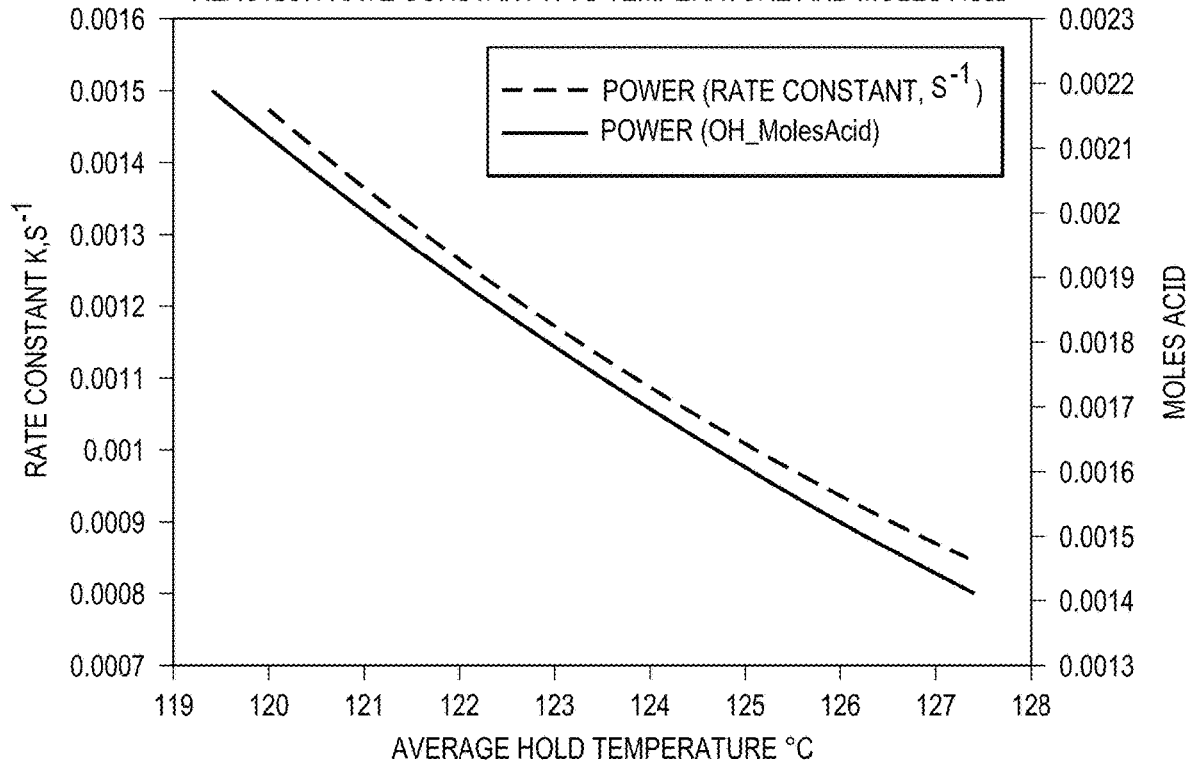

FIG. 12 depicts a graph plotting the rate constant K for Examples 8 to 15 as a function of average reactor hold temperature and both moles of acid and the rate constant. As can be appreciated, the reaction rate constant provides a direct indication of how fast the reaction progresses. As depicted in FIG. 12, as temperatures decreased, the reaction rate constant increased due to the increased concentration of acid.

Figure 13:
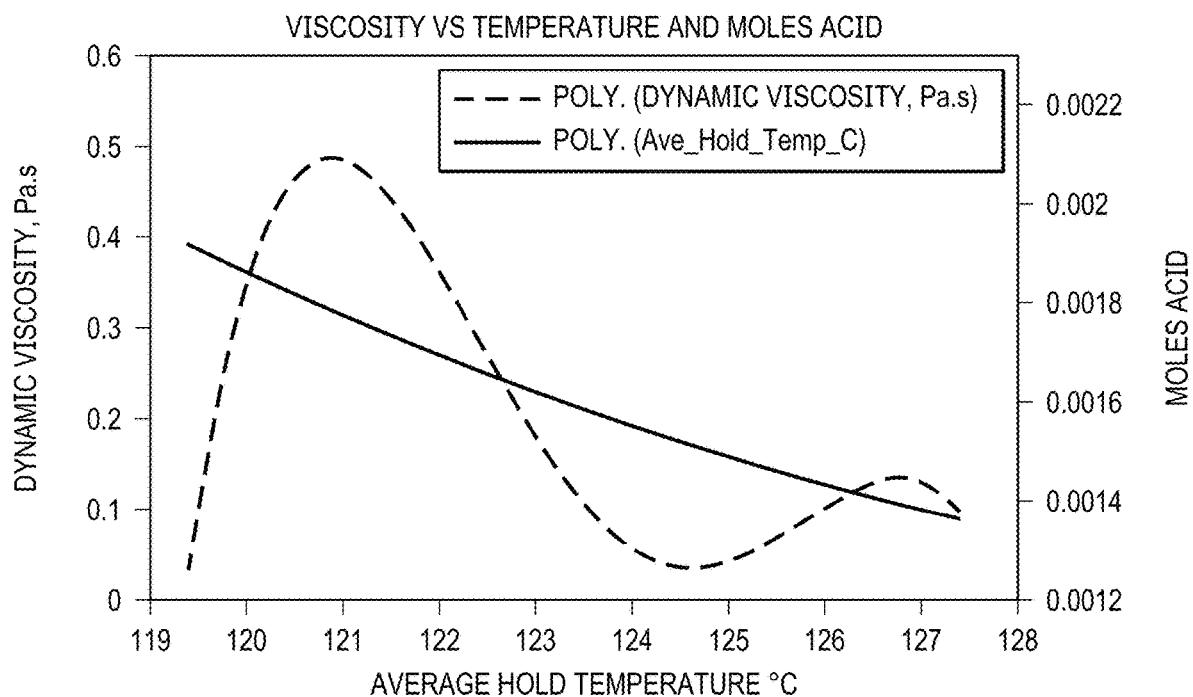

FIG. 13 depicts a graph plotting moles of acid and dynamic viscosity versus reactor temperature to determine the effects acid concentration and temperature had on dynamic viscosity. As depicted in FIG. 13, as reactor temperature begins to decrease, and acid concentration increases, the resin dynamic viscosity also begins to increase. Unexpectedly, as temperature continued to decrease, an unexpected "plateau" was observed where dynamic viscosity decreased significantly.

Figure 14:
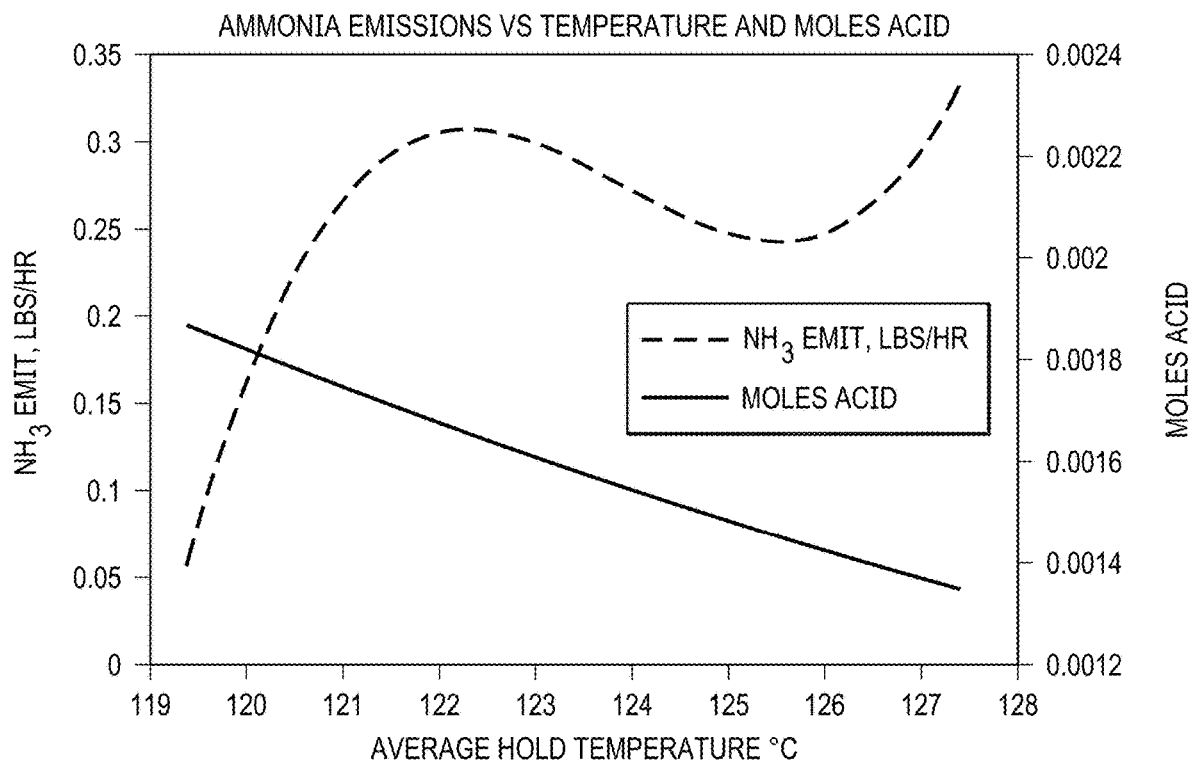

During the conversion of urea formaldehyde to slow-release nitrogen compounds, ammonia is released. It is thought that the ammonia is generated due to the resin being unstable at the reaction temperatures. Accordingly, it is believed that a higher ammonia emission rate means that a resin is less stable than a resin emitting less ammonia. Resin stability is an important factor in determining the relative manufacturability of a resin. FIG. 14 depicts a graph of reactor ammonia remission rate and acid moles versus reaction temperature.

As depicted in FIG. 14, the general trend is for ammonia emission to decrease as reactor temperature decreases. Similar to the "plateau" observed in FIG. 13, a significant decrease in the ammonia emission rate was observed at about 0.0014 moles of phosphoric acid.

Based on the results of FIGS. 11 and 12, it has been discovered that a weak acid can be used to decrease the temperature of the molten reaction temperature without a significant decrease in conversion into MDU and DMTU. Additionally, based on the results depicted in FIGS. 13 and 14, it has been unexpectedly discovered that use of a weak acid, at an appropriate concentration, can be used to reach a "plateau" where dynamic viscosity and ammonia emissions are unexpectedly low. This suggests that at an appropriate concentration (e.g., at a concentration of about 0.0013 moles to about 0.0017 moles), an unexpectedly stable resin is formed.

Without being bound by theory, it is believed that the weak acid catalyzes the reaction of methylene urea to larger, slow-release nitrogen products. At lower temperatures and at higher acid concentrations, the acid increases the reaction rate for the formation of MDU and DMTU while minimizing side reactions that form other products. MDU and DMTU are more stable than the side reactions which often have unstable cyclical structures. This means a more efficient conversion of MDU and MDTU occurs while undesirable side reactions and products are disfavored.

The observed "plateau" area of FIGS. 13 and 14 is believed to represent a reaction zone that favors a faster conversion of methylene urea to MDU and DMTU while disfavoring the formation of side reactions and products. Products formed in this "plateau" area were observed to have superior pumping, spraying, and handling than resin products formed outside of the "plateau" area.

As used herein, all percentages (%) are percent by weight of the total composition, also expressed as weight/weight %, % (w/w), w/w, w/w % or simply %, unless otherwise indicated.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A method of forming a fertilizer composition having slow-release nitrogen compounds, the method comprising:
    forming a molten mixture of urea, formaldehyde, resin modifier, and one or more of a weak acid catalyst and an emulsifier; and
    adjusting, as needed, the temperature of the molten mixture to initiate a reaction of the urea and the formaldehyde to form a fertilizer composition;
    wherein the reaction of the urea and the formaldehyde occurs at an initial temperature of about 110° C. to about 125° C. and at a second temperature of about 125° C. to about 135° C.; and
    wherein the initial temperature is held for about 10 minutes to about 40 minutes and wherein the second temperature is held for about 10 minutes to about 20 minutes.

2. The method of claim 1, wherein the resin modifier comprises crystalline polyethylene wax and the emulsifier comprises a defoaming agent.

3. The method of claim 2, wherein the defoaming agent comprises one or more of a star polymer defoaming agent and a fatty acid defoaming agent.

4. The method of claim 3, wherein the fatty acid defoaming agent comprises polypropylene glycol ester and monoglycerides.

5. The method of claim 3, wherein the molten mixture comprises about 500 parts-per-million ("ppm") to about 2,000 ppm of star polymer defoaming agent and about 600 ppm to about 4,000 ppm of the fatty acid defoaming agent.

6. The method of claim 1, wherein the weak acid catalyst has a $pK_a$ value of about 0.5 to about 5.0.

7. The method of claim 1, wherein the weak acid catalyst comprises one or more of iodic acid, oxalic acid, chlorous acid, phosphoric acid, arsenic acid, chloroacetic acid, citric acid, hydrofluoric acid, nitrous acid, formic acid, and lactic acid.

8. The method of claim 1, wherein the molten mixture comprises about $4.5*10^{-5}$ moles to about $4.0*10^{-3}$ moles of the weak acid catalyst per mole of formaldehyde.

9. The method of claim 1, wherein the reaction of the urea and the formaldehyde occurs at a temperature of about 124° C. to about 127° C.

10. The method of claim 1, wherein the mole ratio of urea to formaldehyde is about 2.4:1 or greater.

11. The method of claim 1, wherein the resin modifier comprises a crystalline polyethylene wax comprising one or more of:
   a molecular weight of about 600 to about 1,200;
   a polydispersity of about 1.02 to about 1.7; and
   a degree of crystallinity of about 65% to about 96%.

12. The method of claim 11, wherein the molten methylene urea mixture comprises about 2% to about 20%, by weight, of the crystalline polyethylene wax.

13. The method of claim 1, wherein the fertilizer composition comprises at least one of methylenediurea ("MDU") and dimethylenetriurea ("DMTU") and wherein the at least one of MDU and DMTU comprises about 35% or more of the total nitrogen in the fertilizer composition; and
   wherein the fertilizer composition comprises about 8% or less cold-water insoluble nitrogen.

14. The method of claim 13, further comprising the step of spray drying the fertilizer composition; and
   wherein the fertilizer composition has a uniformity index after spraying of about 25 or greater.

15. The method of claim 13, wherein the fertilizer composition is sprayed on an inert carrier to form a granule.

16. The method of claim 1, wherein the fertilizer composition exhibits a peak storage modulus of about 2,000,000 Pa or less.

17. The method of claim 1, wherein the molten mixture has a dynamic viscosity of about 0.3 Pa·s or less at a temperature of about 129.5° C.

18. The method of claim 1 is a continuous process.

* * * * *